Oct. 25, 1966 P. W. HARLAND ETAL 3,280,632
PRESSURE GAUGE
Filed March 26, 1964. 2 Sheets-Sheet 1
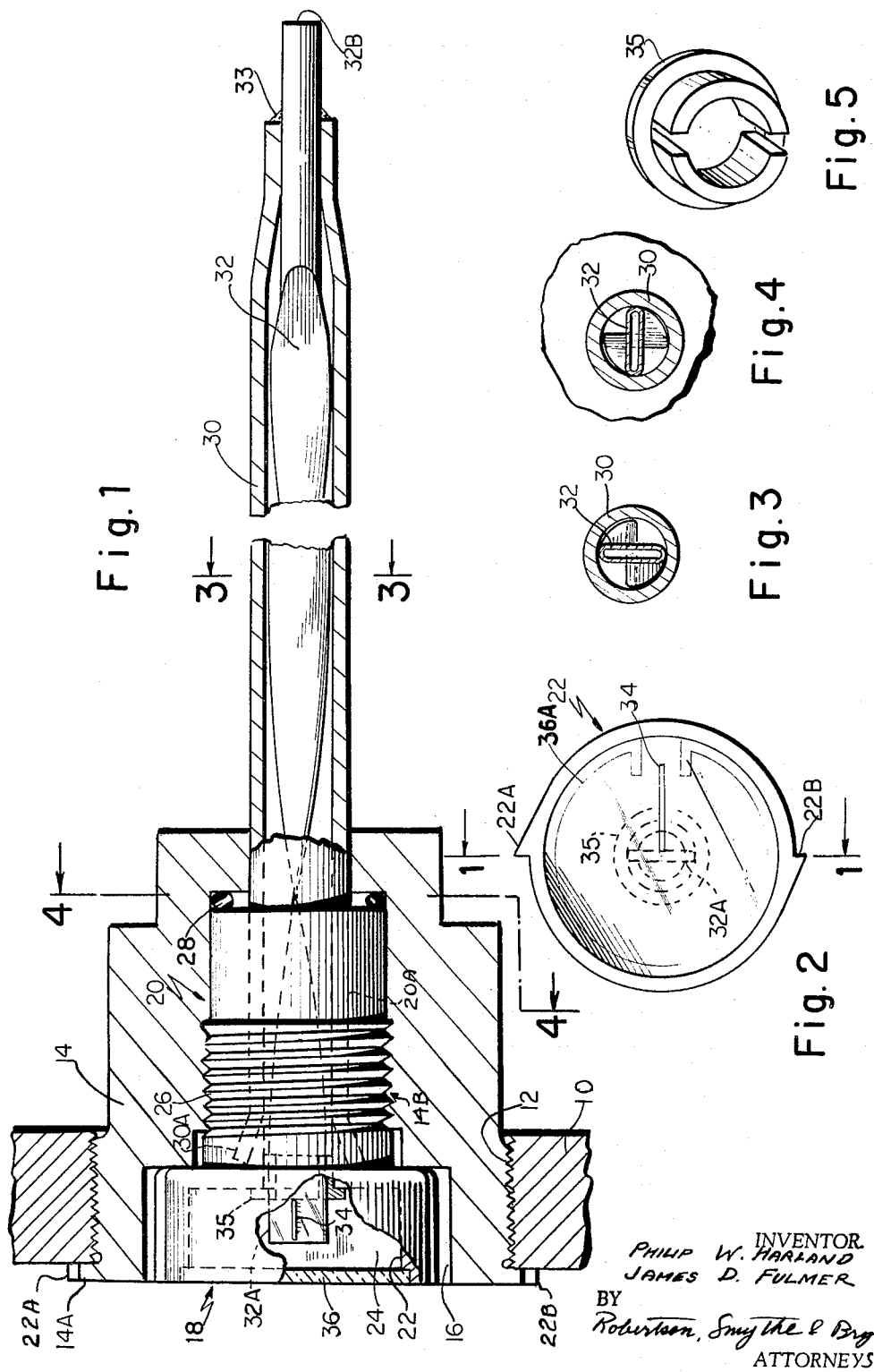
INVENTOR.
PHILIP W. HARLAND
JAMES D. FULMER
BY
Robertson, Smythe & Bryan
ATTORNEYS

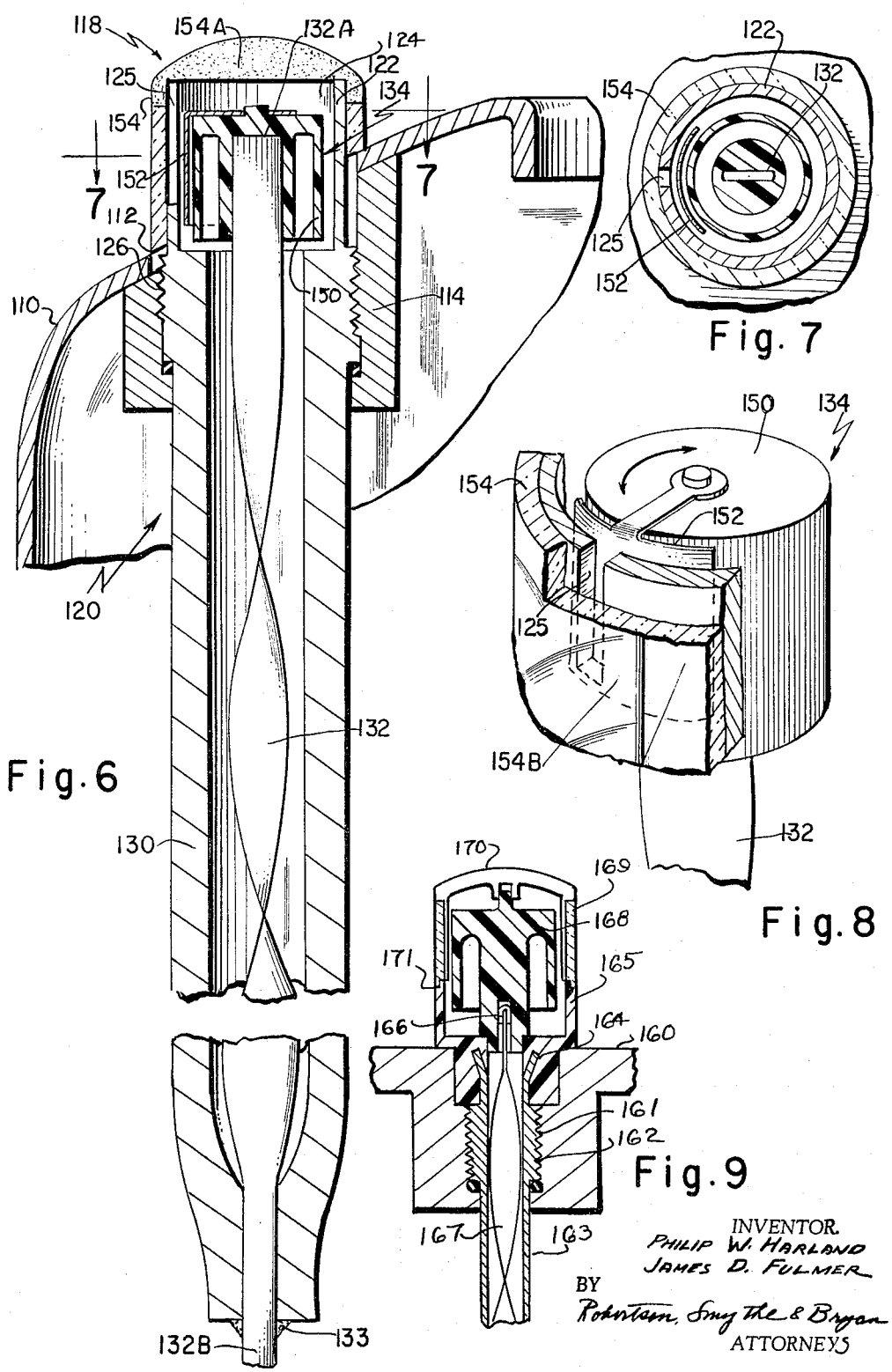

United States Patent Office 3,280,632
Patented Oct. 25, 1966

3,280,632
PRESSURE GAUGE
Philip W. Harland, Perkasie, and James D. Fulmer, Quakertown, Pa., assignors to Ametek, Inc., New York, N.Y., a corporation of Delaware
Filed Mar. 26, 1964, Ser. No. 354,898
4 Claims. (Cl. 73—418)

This invention relates in general to a pressure gauge and particularly to a twisted pressure responsive gauge.

In some applications for fire extinguishers of the non-refillable type, a pressure gauge is required for determining whether the pressure has been lost. Such a gauge must be small in size and inexpensive because it will be discarded along with the fire extinguisher tank. Prior gauges were found to be too big and expensive to completely answer the requirements.

One of the objects of this invention is to provide a pressure gauge for use in a pressure container, such as a fire extinguisher, wherein the quantity of the fluid in the container is indicated by the pressure of the fluid.

A further object of the invention is to provide a simple, small inexpensive gauge which is placed in a pressure container in such a manner that it is protected against damage.

In one aspect of the invention, the gauge has a main body with outer, intermediate and inner tubular portions. The outer tubular portion is cup-shaped, while the intermediate portion is threaded so that it can be fitted into a pressure container. The inner portion extends into the interior of the pressure container for a substantial distance. A longitudinally extending pressure responsive tube, closed at one end and open at the other end, extends the length of said main body, the open end extending just beyond and being hermetically sealed to the end of said main body. An indicator is arranged within the cup-shaped portion of the main body which is actuated by the arcuate motion of the closed end of the pressure tube to indicate the quantity of fluid within the pressure container.

Other objects, advantages and features of the invention will be apparent from the following description and drawings which are merely exemplary.

In the drawings:

FIG. 1 is a side view, partially in section, of one form of the invention;

FIG. 2 is an end view of FIG. 1 looking from the left end thereof;

FIG. 3 is a sectional view taken along the line 3—3 of FIG. 1;

FIG. 4 is a sectional view taken along the line 4—4 of FIG. 1;

FIG. 5 is a perspective view of a bushing used to center the tube;

FIG. 6 is a side view, partly in section, of another form of the invention;

FIG. 7 is a cross sectional view taken along the line 7—7 of FIG. 6;

FIG. 8 is a fragmentary perspective view of a portion looking from the top of FIG. 6; and FIG. 9 is a fragmentary sectional view of another form of the invention.

A pressure container having walls 10 (FIG. 1), such as a dry chemical fire extinguisher wherein the quantity of chemicals within the extinguisher is indicated by the pressure of such chemicals, is arranged with a threaded opening 12. There is threadedly mounted in said opening 12 a bushing 14 having a shoulder portion 14A arranged to fit securely against the outer surface of the pressure vessel 10 in sealed relation thereto. The bushing 14 has a recess 16 for receiving the pressure responsive gauge 18.

Gauge 18 has a main body 20, the outer tubular portion 22 of which has a cup-shaped opening 24 in the end thereof. The main body 20 has an intermediate threaded tubular portion 26 fixed in the opening 14B of the bushing 14 in such a way that the outer portion 22 of the main body 20 has its cup-shaped portion 24 almost completely contained within the recess 16 of the bushing, and the inner end of the intermediate portion compresses an O-ring seal 28 against the base of bushing 14. The outside of outer tubular portion 22 has two oppositely located lugs 22A, 22B to assist in assembling the gauge in position within cup-shaped opening 24.

The gauge has an inner tubular portion in the form of a guard tube 30 with one end 30A flared and fixedly located in the inner bore 20A of tubular body 20. Guard tube 30 extends a substantial distance away from the main body 20 into container 10. A longitudinally twisted pressure responsive tube 32 having a closed outer end 32A and an open inner end 32B is hermetically sealed at point 33 to guard tube 30. The closed end 32A projects into cup-shaped portion 24 of the outer tubular body 22. A slotted bushing 35 (FIGS. 1, 5) is slipped on the twisted tube 32 near the outer end 32A and maintains the tube 32 centered during its arcuate movement.

An indicator pointer 34 is arranged within the cup-shaped portion 24 so as to be turned by the closed end of the twisted tube 32 as it twists under pressure. Pointer 34 is directly attached to the closed end 32A in a plane which is perpendicular to the plane of the flattened tube. Clear lens or window 36 is fitted across the opening of the cup-shaped portion 24 in recessed edges thereof and is hermetically sealed therein. The inside face of the lens 36 has indicia 36A associated therewith, such as indicated in FIG. 2. The indicia, in conjunction with the pointer 34, indicate the condition or the quantity of pressurized fluid within container 10.

The operation of the invention is such that when the gauge 18 is fixed within the bushing 14, the cup-shaped portion 22 is completely within the recessed portion 16 of the bushing so that the exterior of the gauge is protected from accidental damage while handling pressure container 10. The interior portion of the gauge projects into the interior of the pressure container and the pressure is in communication with the interior of the tube 32 through opening 32B in the end thereof. In view of hermetic seal 34, the pressure within tube 32 will tend to cause it to attempt to become round. In so doing, the tube will twist and the amount of twist will be proportional to the pressure in the tube. Thus, pointer 34, when attached to closed end 32A, will rotate and indicate, in conjunction with the indicia on lens or window 36, the condition of the fluid or material within the pressure container.

A second form of the invention is illustrated in FIGS. 6, 7 and 8 wherein a pressure container 110 has an opening 112 to which there is affixed interiorly threaded bushing 114. A pressure responsive gauge 118 is fixed in bushing 114. Gauge 118 has main body 120 with an outer tubular portion 122 having a cup-shaped opening 124 and a narrow longitudinal slot 125 (FIGS. 6, 7, 8). The main body 120 has an intermediate threaded portion 126 fixed in the opening of the bushing 114 in a hermetically sealed relationship.

Gauge 118 has an inner tubular portion or body 130 extending into the pressure container 110 for a substantial distance. Within the main body 120 there is twisted pressure responsive tube 132 having a closed outer end 132A and an open inner end 132B which is hermetically sealed at 133 to tubular body portion 130. Closed end 132A is arranged to project into the cup-shaped portion 124 of the outer tubular portion 122.

An indicator 134 is located within cup-shaped portion 124 and is actuated by the motion of the closed end 132A of the twisted tube 132 under the influence of changing pressure in the container.

Indicator 134 consists of a drum 150 (FIGS. 6, 7, 8) fixed on the end 132A of twisted tube 132. Drum 150 has indicia on the sides in the form of contrasting color. The drum 150 may be of a shaped, colored plastic and may have a neutral or contrasting colored shield 152 with both the shield and the drum arranged to rotate together opposite slot 125.

Dome-shaped cover 154 has a frosted, translucent or opaque top portion 154A and a transparent window portion 154B opposite the slot 125, the cover 154 sealing cup-shaped portion 122.

The operation of the embodiment shown in FIGS. 6, 7 and 8 is such that when the twisted tube 132 rotates under the influence of pressure within pressure container 110, indicia of drum 150 will be seen through slot 125 and the transparent portion 154B to give an indication of the pressure within the container.

A still further form is shown in FIG. 9 wherein container 160 has a threaded aperture 161 into which can be threadedly attached threads 162 of guard tube 163. Tube 163 has a flared mouth portion 164 which has plastic cup portion 165 molded thereon or attached thereto. Closed end 166 of twisted tube 167 carries indicator drum 168, said drum having indicia thereon cooperating with slot or window means 169. Cover piece 170 is hermetically sealed at 171 to cup-shaped portion 165.

It should be apparent that changes may be made in details of construction without departing from the spirit of the invention except as covered by the claims.

What is claimed is:
1. A gauge comprising a main body having outer intermediate and inner tubular portions, said outer portion being cup shaped with a narrow longitudinally arranged slot therein, said intermediate portion being threaded and arranged to be fixed thereby in an opening of a pressure container, the inner portion of the tubular main body arranged to be extended into said pressure container for a substantial distance, a twisted pressure responsive tube closed at one end and open at the other end, said twisted tube being contained within and extending throughout the length of said main body with its open end extending just beyond and hermetically sealed to the extended inner end of said main body, a dome-like cover for said cup shaped portion having transparent sides, the closed end of said twisted tube extending into the interior of the cup shaped outer portion of said main body, and an indicator shaped as a drum and fixed on said closed end with the drum sides opposite said slot, the drum sides having indicia thereon so that when pressure causes an arcuate movement of the drum, a state of the fluid in the container is indicated by viewing said indicia through said slot.

2. A gauge comprising a main body having outer intermediate and inner tubular portions, said outer portion being cup shaped and having slot means in the wall thereof, said intermediate portion being threaded and arranged to be fixed thereby in an opening of a pressure container, the inner portion of the tubular main body being arranged to extend into said pressure container for a substantial distance, a twisted pressure-responsive tube closed at one end and open at the other end, said twisted tube being contained within and extending throughout the length of said main body with its open end extending just beyond and hermetically sealed to the extended inner end of said main body, and an indicator within said cup shaped portion actuated by the arcuate movement at the closed end of said twisted tube when under pressure, said indicator comprising a drum with an adjustable sector of contrasting color thereon and cooperating with said slot means to indicate the condition within said container.

3. A gauge comprising a body having an outer portion, intermediate plastic portion, and inner tubular portion, said outer portion being cup shaped, one end of said inner portion being flared, said intermediate portion being threaded and arranged to be fixed thereby in an opening of a pressure container, the other end of the inner tubular portion of the body being arranged to extend into said pressure container for a substantial distance, said cup shaped outer portion of the body being secured to said flared end of said inner portion, a twisted pressure-responsive tube closed at one end and open at the other end, said twisted tube being contained within and extending throughout the length of said main body with its open end extending just beyond and hermetically sealed to said other end of said inner tubular portion, and an indicator within said cup shaped portion actuated by the arcuate movement at the closed end of said twisted tube when under pressure to indicate the condition within said container.

4. A gauge comprising a tubular main body having an outer portion, intermediate and inner tubular portions, said outer portion being cup shaped, at least one of said portions being arranged to be fixed in an opening of a pressure container, the inner tubular portion of the tubular main body being arranged to extend into said pressure container for a substantial distance, one end of said inner tubular portion being fixedly embedded in said cup shaped outer portion, a twisted pressure-responsive tube closed at one end and open at the other end, said twisted tube being contained within and extending throughout the length of said gauge body with its open end extending just beyond and hermetically sealed to the extended inner tubular portion, and an indicator within said cup shaped portion actuated by the arcuate movement at the closed end of said twisted tube when under pressure to indicate the condition within said container.

References Cited by the Examiner

UNITED STATES PATENTS 2,925,734  2/1960  Gorgens _____ 73—418 X
3,213,688  10/1965  Huston _____ 73—418 X

FOREIGN PATENTS 22,373  11/1899  Great Britain.

LOUIS R. PRINCE, *Primary Examiner.*

D. O. WOODIEL, *Assistant Examiner.*